(12) United States Patent
Chen et al.

(10) Patent No.: US 9,625,017 B2
(45) Date of Patent: Apr. 18, 2017

(54) CIRCULATING DEVICE FOR MOTION GUIDE APPARATUS

(71) Applicant: Hiwin Technologies Corp., Taichung (TW)

(72) Inventors: Yan-Yu Chen, Taichung (TW); Wuteng Hsieh, Taichung (TW)

(73) Assignee: Hiwin Technologies Corp., Situn Taichung (TW)

(*) Notice: Subject to any disclaimer, the term of this patent is extended or adjusted under 35 U.S.C. 154(b) by 606 days.

(21) Appl. No.: 13/763,750

(22) Filed: Feb. 11, 2013

(65) Prior Publication Data

US 2014/0224052 A1   Aug. 14, 2014
US 2016/0265637 A9   Sep. 15, 2016

Related U.S. Application Data

(63) Continuation of application No. 12/655,451, filed on Dec. 30, 2009, now abandoned.

(51) Int. Cl.
F16H 1/24   (2006.01)
F16H 55/02  (2006.01)
F16H 25/22  (2006.01)

(52) U.S. Cl.
CPC ..... F16H 25/2214 (2013.01); F16H 25/2233 (2013.01); Y10T 74/19767 (2015.01)

(58) Field of Classification Search
CPC .............. F16H 25/2214; F16H 25/2238; F16H 25/2204; F16H 57/0497; F16H 25/2233; F16H 25/20
USPC .............................. 74/424.82, 424.86, 424.88
See application file for complete search history.

(56) References Cited

U.S. PATENT DOCUMENTS

| | | | | |
|---|---|---|---|---|
| 5,993,064 A | * | 11/1999 | Teramachi | F16C 29/0642 384/43 |
| 6,070,479 A | * | 6/2000 | Shirai | F16C 29/0659 384/51 |
| 6,089,117 A | * | 7/2000 | Ebina | F16C 33/3825 74/424.87 |
| 6,892,596 B2 | * | 5/2005 | Michioka et al. | 74/424.88 |
| 2010/0050802 A1 | * | 3/2010 | Chen | 74/424.88 |
| 2010/0122596 A1 | * | 5/2010 | Lin | F16H 25/2219 74/424.83 |
| 2011/0023641 A1 | * | 2/2011 | Chiu et al. | 74/424.88 |
| 2011/0023642 A1 | * | 2/2011 | Hsu et al. | 74/424.88 |
| 2011/0154927 A1 | * | 6/2011 | Chen et al. | 74/424.86 |
| 2012/0137808 A1 | * | 6/2012 | Chen et al. | 74/424.88 |
| 2012/0304793 A1 | * | 12/2012 | Chen | 74/424.88 |

\* cited by examiner

*Primary Examiner* — William C Joyce
(74) *Attorney, Agent, or Firm* — Charles E. Baxley (57) ABSTRACT

A motion guide device includes a ball nut attached onto a shaft and having helical grooves for receiving ball bearing elements, a ball circulating member is engaged with the ball nut and includes a ball circulating channel communicative with the helical groove of the ball nut, and includes an intermediate segment and two end segments, a ball coupler includes two flexible coupling members for engaging with the ball bearing elements, and the ball circulating member includes two opposite helical guide pathways for receiving the flexible coupling members of the ball coupler, and curved relative to the ball circulating member for smoothly guiding the flexible coupling members to move through the ball circulating member.

4 Claims, 9 Drawing Sheets

CIRCULATING DEVICE FOR MOTION GUIDE APPARATUS

The present Application is a Continuation-in-part Application based on parent, co-pending U.S. patent application Ser. No. 12/655,451 titled CIRCULATING DEVICE FOR MOTION GUIDE APPARATUS.

This Application is a Continuation-in-part based on co-pending, parent U.S. patent application Ser. No. 12/655,451.

BACKGROUND OF THE INVENTION

1. Field of the Invention

The present invention relates to a motion guide apparatus, such as a linear motion guide apparatus or a ball screw device, and more particularly to a motion guide apparatus including two movable members or a screw shaft and a ball nut movable relative to each other, and a ball circulating device attached to one of the two movable members for suitably circulating and guiding the ball bearing elements to move through an endless ball guiding passage in the ball screw device or between the two movable members.

2. Description of the Prior Art

Typical motion guide apparatuses, such as the linear motion guide apparatuses or the ball screw devices comprise two movable members rotatable or movable relative to each other, and a number of ball bearing elements disposed between the two movable members for facilitating the sliding movement between the two movable members, and two or more ball circulating elements attached to the ball nut and communicative with the helical groove portions of the screw shaft and the ball nut for forming an endless ball guiding passage in the ball screw device or between the two movable members and for slidably receiving a number of ball bearing elements.

For example, U.S. Pat. No. 5,993,064 to Teramachi et al., and U.S. Pat. No. 6,089,117 to Ebina et al. disclose two of the typical linear motion guide devices and ball screw devices comprising a ball nut pivotally or rotatably coupled onto a screw shaft, and a helically running threaded channel provided between the screw shaft and the ball nut for receiving a number of loaded ball bearing elements and for facilitating the sliding movement between the screw shaft and the ball nut, and two or more tubular circulating elements attached to the ball nut and having ball circulating channels communicative with the helical groove portions of the screw shaft and the ball nut for forming the endless helically running threaded channel in the ball screw device or between the screw shaft and the ball nut.

For suitably or smoothly guiding or circulating the ball bearing elements through the ball circulating channels in the tubular circulating elements, the tubular circulating elements each include four guide grooves formed through the length of each of the tubular circulating elements and communicative with the returning channels of the tubular circulating elements respectively for receiving or engaging with the flexible coupling members of the ball couplers that hold or support the ball bearing elements.

However, the end portions of the tubular circulating elements include a ninety degree (90) turning angle, and the guide grooves of the tubular circulating elements are also turned with a ninety degree (90) angle, and the flexible coupling members of the ball couplers are snugly fitted and received or engaged with the guide grooves of the tubular circulating elements such that the flexible coupling members of the ball couplers may be twisted by the tubular circulating elements and such that the ball bearing elements may not be suitably guided to move through the ball running channel of the tubular circulating elements.

The present invention has arisen to mitigate and/or obviate the afore-described disadvantages of the conventional motion guide apparatuses or ball screw devices.

SUMMARY OF THE INVENTION

The primary objective of the present invention is to provide a motion guide apparatus including two movable members movable relative to each other, and a ball circulating device attached to one of the two movable members or a screw shaft and a ball nut for suitably guiding and circulating the ball bearing elements to move through an endless ball guiding passage in the ball screw device or between the two movable members.

The other objective of the present invention is to provide a motion guide apparatus including a ball circulating device having a ball circulating channel rotated for an angle ranging from 160 to 220 degrees for suitably guiding and circulating the ball bearing elements and the flexible coupling members of the ball couplers to move through an endless ball guiding passage in the ball screw device or between the two movable members.

In accordance with one aspect of the invention, there is provided a motion guide apparatus comprising an elongated shaft including a helical groove formed on an outer peripheral surface, a ball nut movably attached onto the elongated shaft, and including a bore for receiving the elongated shaft, and including a helical groove, and including two orifices communicative with the helical groove of the ball nut, the elongated shaft including an outer diameter smaller than an inner diameter of the bore of the ball nut for forming a gap between the elongated shaft and the ball nut, a ball circulating member engaged with the orifices of the ball nut and including a ball circulating channel formed in the ball circulating member and communicative with the helical groove of the ball nut for forming an endless ball guiding passage between the ball nut and the elongated shaft, the ball circulating member including a first end segment and an intermediate segment and a second end segment, the ball circulating channel of the ball circulating member being formed by an intermediate portion and two end portions, a plurality of ball bearing elements received and engaged with the endless ball guiding passage, and a ball coupler including two flexible coupling members having a plurality of openings formed between spacers for receiving and engaging with the ball bearing elements, and wherein the ball circulating member includes two opposite guide pathways formed through the intermediate segment and the end segments of the ball circulating member and communicative with the intermediate portion and the end portions of the ball circulating channel of the ball circulating member for receiving and engaging with the flexible coupling members of the ball coupler, the opposite guide pathways of the ball circulating member and the flexible coupling members of the ball coupler are helical and rotated and turned relative to the ball circulating member, between the end segments of the ball circulating member, a first guide pathway of the opposite guide pathways of the ball circulating member includes a first end portion located at an inner side of a first end segment of the ball circulating member and a second end portion located at an inner side of a second end segment of the ball circulating member, and a second guide pathway of the opposite guide pathways of the ball circulating member includes a first end portion located at an outer side of the first end segment of the ball circulating member and a second end portion located at an outer side of the second end segment of the ball circulating member.

The opposite guide pathways of the ball circulating member each include two end portions aligned with and communicative with the gap that is formed between the elongated shaft and the ball nut. The flexible coupling members of the ball coupler are received and engaged with the gap that is formed between the elongated shaft and the ball nut.

The opposite guide pathways of the ball circulating member are helical and curved and rotated relative to the ball circulating member, between the end segments of the ball circulating member, for an angle ranged between 160-220 degrees.

The opposite guide pathways of the ball circulating member are curved and rotated relative to the ball circulating member, between the end segments of the ball circulating member, for an angle ranged between 175-185 degrees.

The opposite guide pathways of the ball circulating member are curved and rotated relative to the ball circulating member, between the end segments of the ball circulating member, for an angle of 180 degrees.

The ball circulating member includes at least two members each having a portion of the intermediate segment and the end segments, and each having a portion of the ball circulating channel formed therein.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
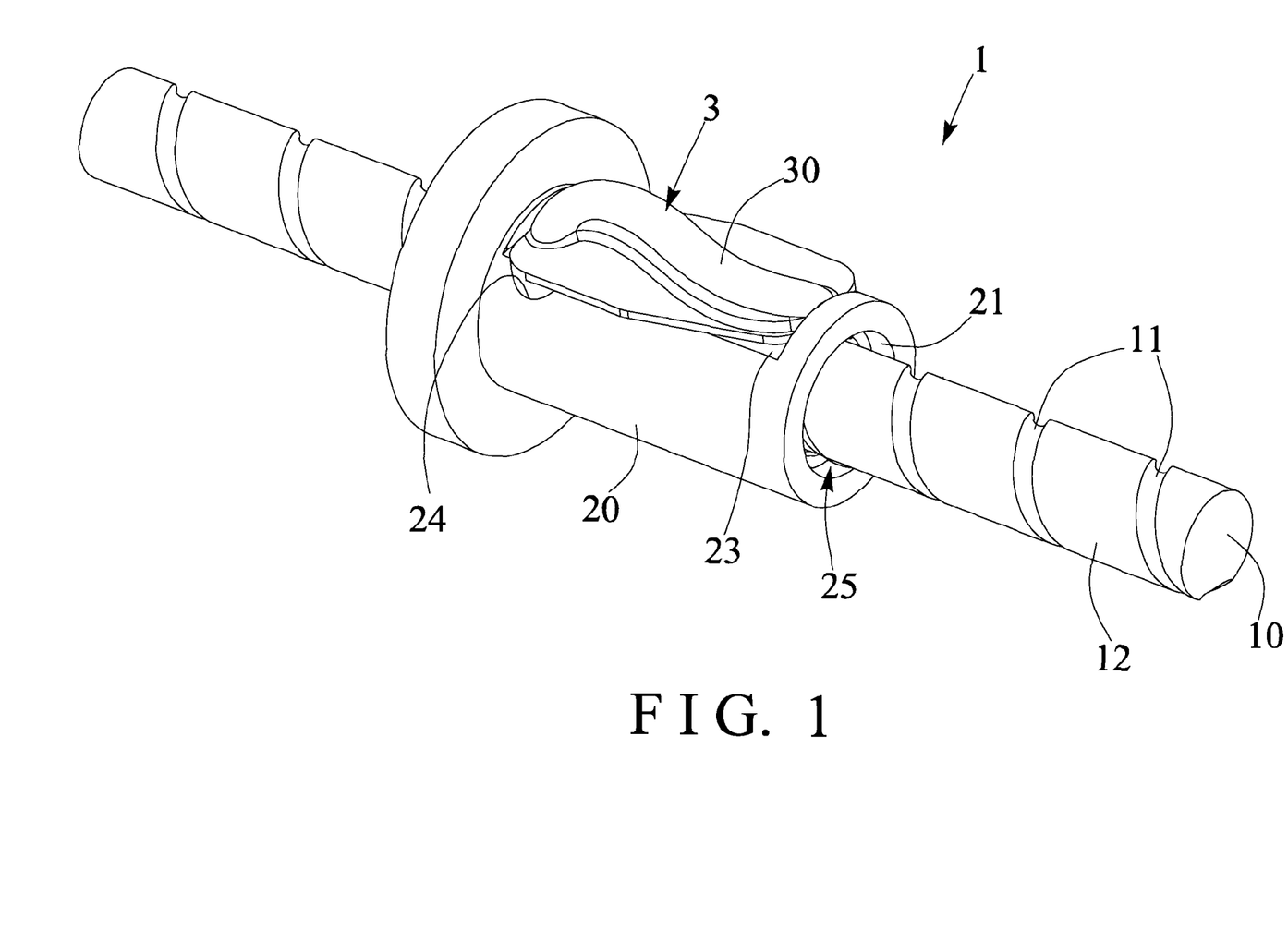
FIG. 1 is a partial perspective view of a motion guide apparatus in accordance with the present invention.
Figure 2:
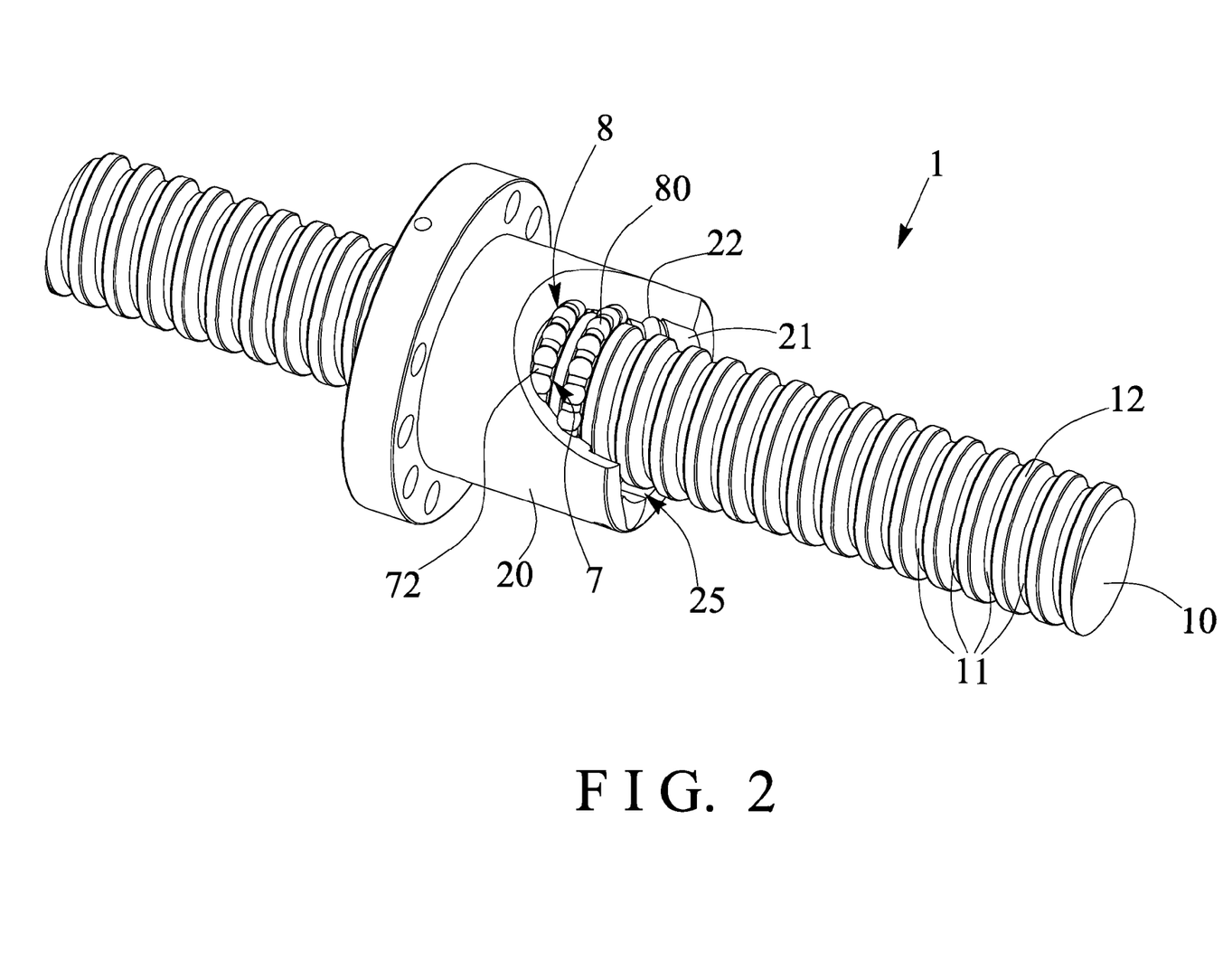
FIG. 2 is another partial perspective view of the motion guide apparatus, in which a portion of the ball nut has been cut off for showing the inner structure of the ball nut and the screw shaft of the motion guide apparatus.
Figure 3:
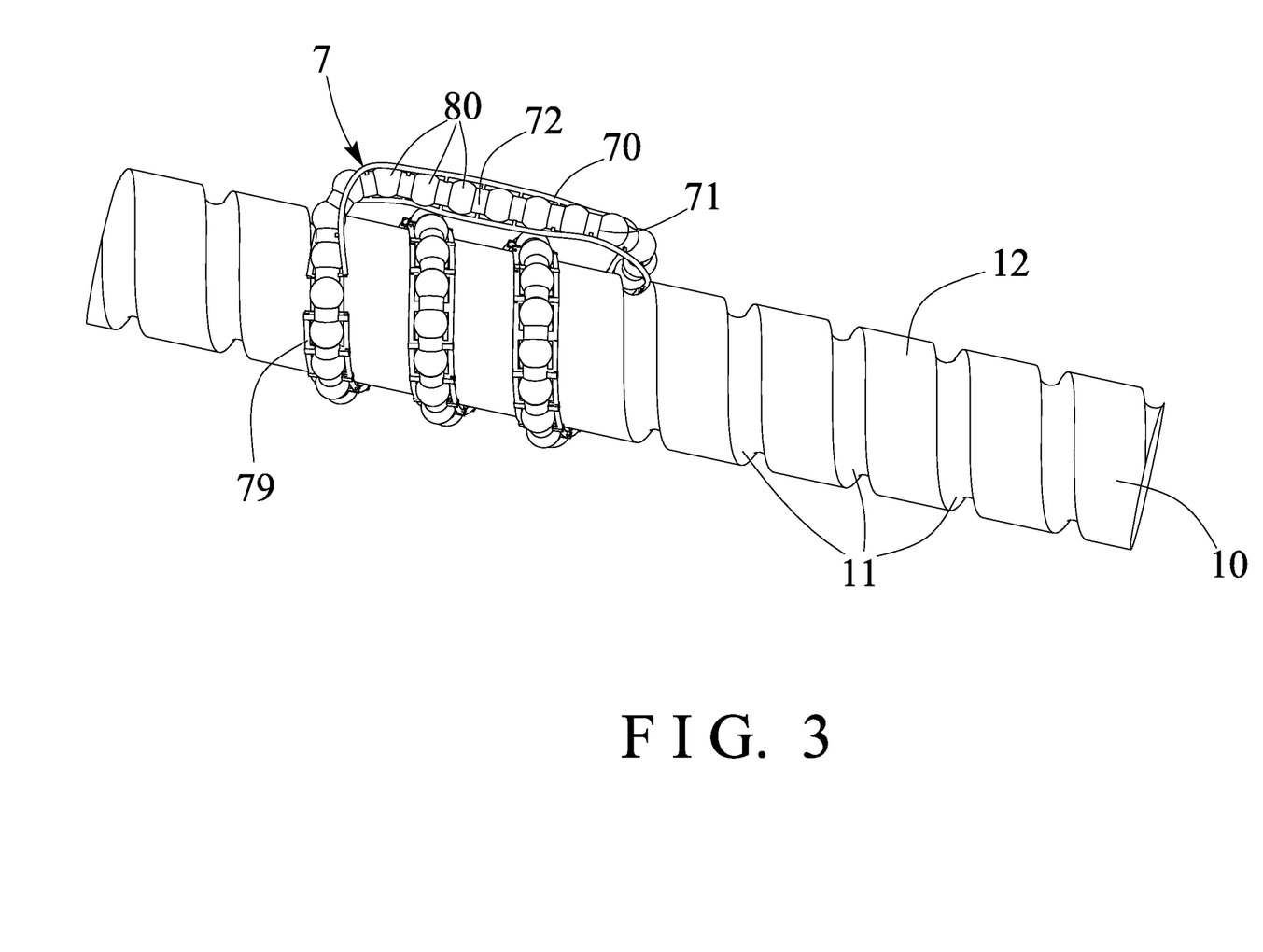
FIG. 3 is a further partial perspective view illustrating the ball coupler and the screw shaft and the ball bearing elements of the motion guide apparatus.

Referring to the drawings, and initially to FIGS. 1-2 and 3, a motion guide apparatus 1 in accordance with the present invention, such as a ball screw device 1, comprises an elongated bolt or screw shaft 10 including a number of helical threaded portions or grooves 11 formed on the outer peripheral portion thereof, or formed in the outer peripheral surface 12 thereof, and a movable member, such as a ball nut 20 including a screw hole or bore 21 formed therein for receiving or engaging with the elongated screw shaft 10, and the screw hole or bore 21 of the ball nut 20 is formed or defined by a number of helical threaded portions or grooves 22 for threading or engaging or aligning with the helical threaded portions or grooves 11 of the screw shaft 10, and for forming one or more endless multiple-turn, helical raceways or ball guiding passages 8 (FIG. 2) between the screw shaft 10 and the ball nut 20, and for slidably receiving a number of ball bearing elements 80 and for facilitating the sliding or rotational movement between the two movable members 10, 20 or the screw shaft 10 and the ball nut 20.

The ball nut 20 includes a cut off portion or a flat surface 23 formed in the outer peripheral portion thereof (FIG. 1), and includes two or more orifices 24 formed therein and intersecting or communicating with the cut off portion or flat surface 23 of the ball nut 20, and also intersecting or communicating with the ball guiding passages 8 or the helical threaded portions or grooves 11, 22 of the screw shaft 10 and the ball nut 20 for receiving or engaging with the ball circulating devices 3 which are engaged with or attached or mounted or secured to the ball nut 20 with latches or fasteners (not shown) for guiding or circulating or returning the ball bearing elements 80 to move cyclically in the endless multiple-turn, helical raceway or ball guiding passage 8 of the ball screw device 1. For clearly showing purposes, only one of the ball circulating devices 3 has been shown in the drawings. The screw shaft 10 includes an outer diameter smaller than the inner diameter of the bore 21 of the ball nut 20 for forming a gap 25 between the screw shaft 10 and the ball nut 20.

As also shown in FIGS. 2 and 3, the motion guide apparatus 1 further includes one or more ball couplers 7 each having one or more (such as two) flexible coupling members 70, 79 and each having a number of openings 71 formed in or between the flexible coupling members 70, 79, or formed between a number of spacers 72 for receiving or attaching or holding or supporting or engaging with the ball bearing elements 80 and for stably anchoring and positioning the ball bearing elements 80 between the screw shaft 10 and the ball nut 20 or in the endless multiple-turn, helical raceway or ball guiding passage 8 of the ball screw device 1 and for facilitating the sliding movement between the screw shaft 10 and the ball nut 20. The above-described structure is typical and will not be described in further details.

As shown in FIGS. 1 and 4-6, the ball circulating device 3 includes a ball circulating member 30 having a ball circulating channel 31 formed therein for suitably and rotatably and/or movably receiving or engaging with or positioning the ball bearing elements 80 and the spacers 72 of the ball coupler 7, in which the ball circulating member 30 of the ball circulating device 3 includes a substantially C or U-shaped structure having a straight middle or longitudinal or intermediate segment 32, and a first curved or end segment 33 formed or located at an outer or free end portion of the intermediate segment 32 and a second curved or end segment 34 formed or located at the other outer or free end portion of the intermediate segment 32, in which the ball circulating channel 31 of the ball circulating member 30 of each ball circulating device 3 is formed or defined by an intermediate portion 35 and two curved or end coupling portions 36.

Figure 4:
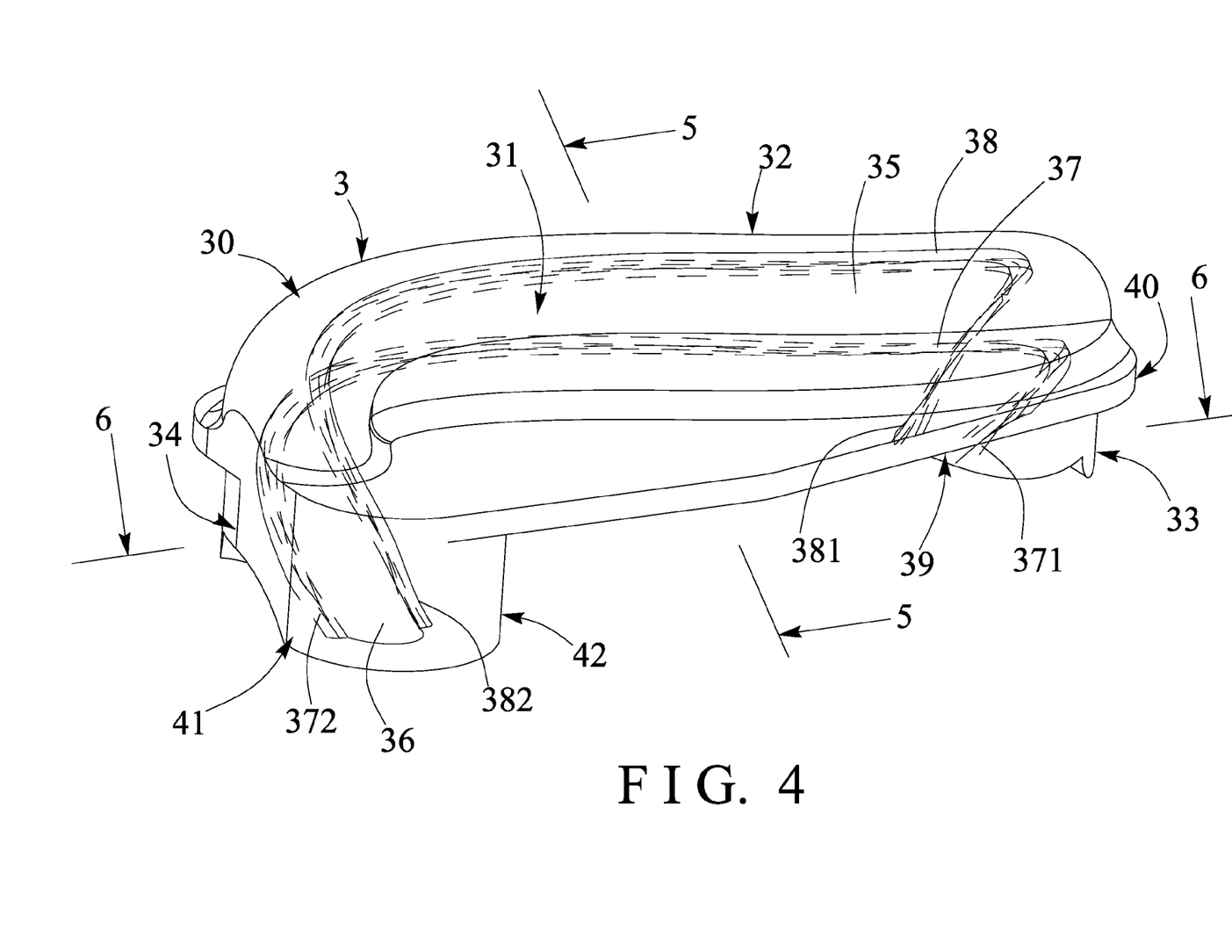
FIG. 4 is a partial perspective view illustrating the ball circulating channel and the guide pathways of the ball circulating device of the motion guide apparatus.
Figure 5:
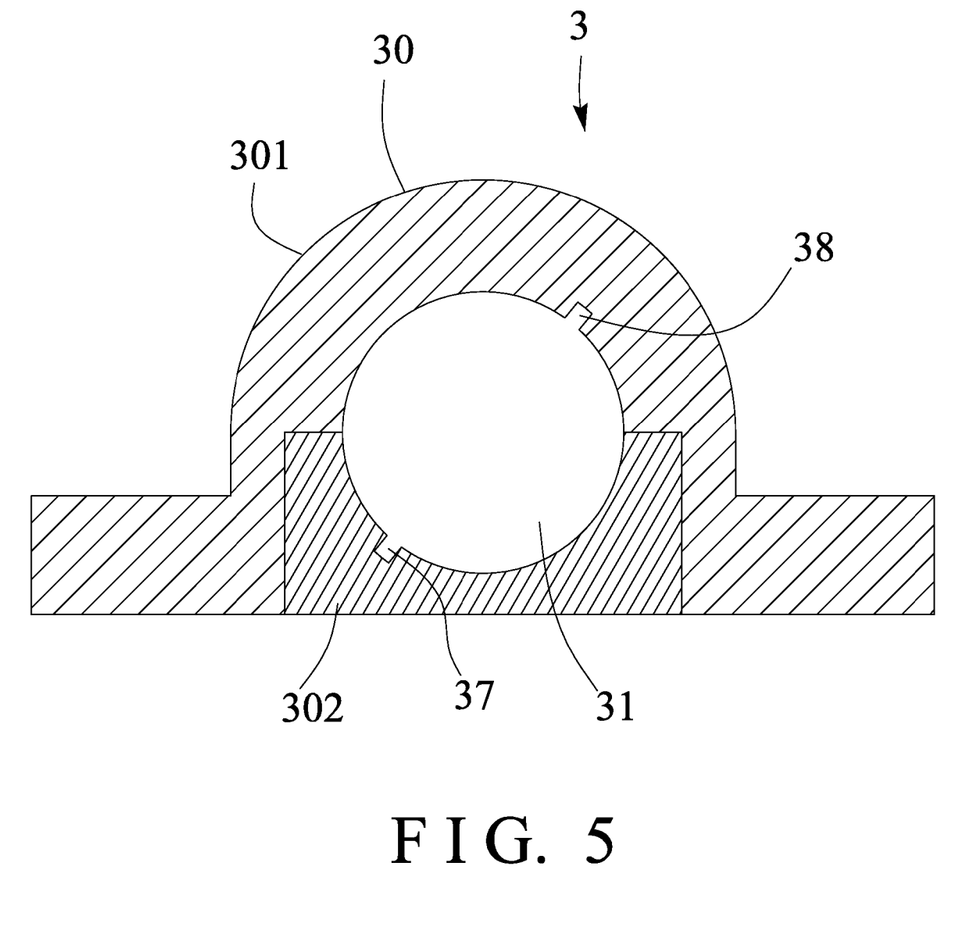
FIGS. 5, 6 are cross sectional views of the ball circulating device of the motion guide apparatus taken along lines 5-5, and 6-6 of FIG. 4 respectively.
Figure 6:
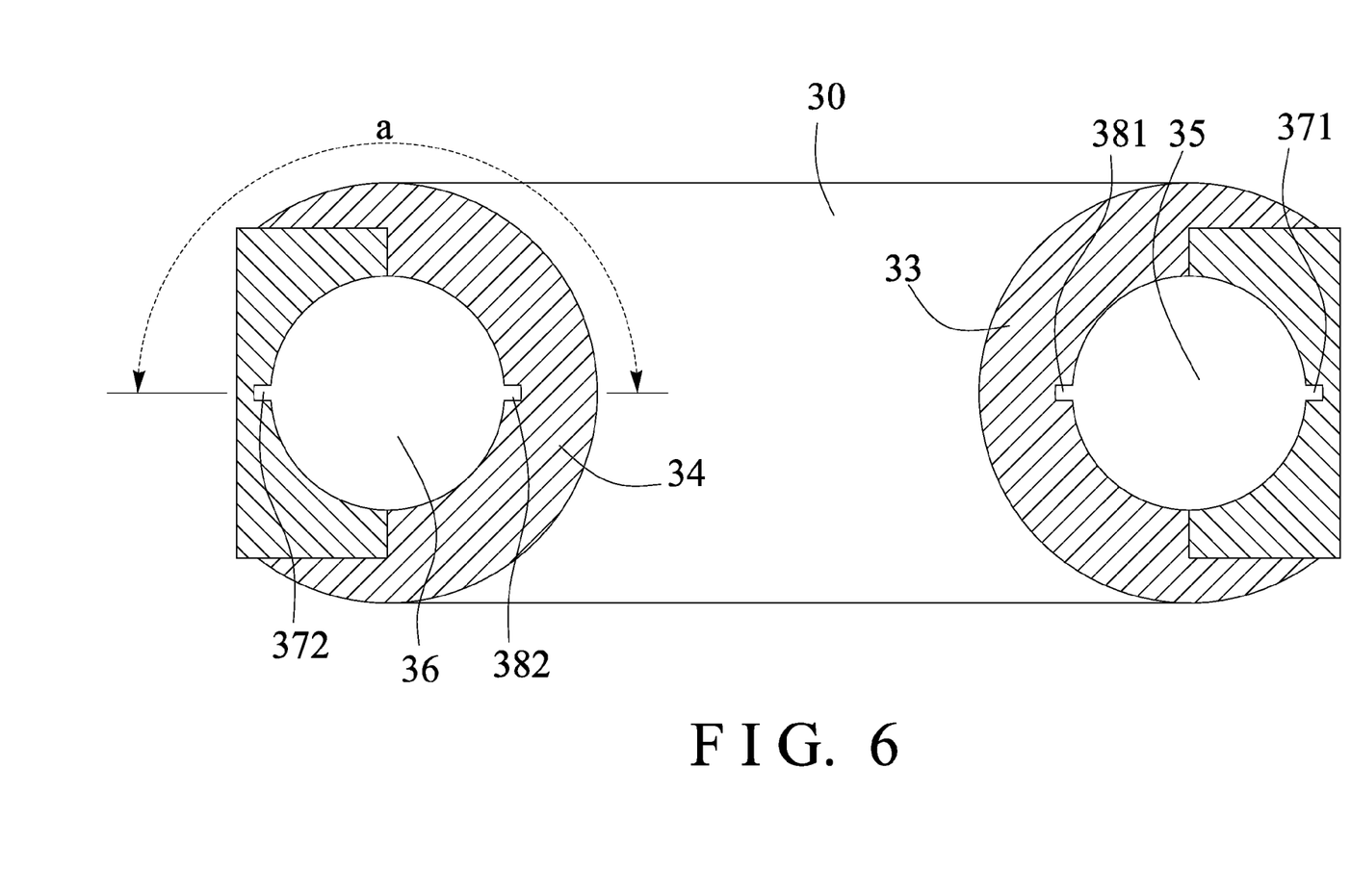
Figure 7:
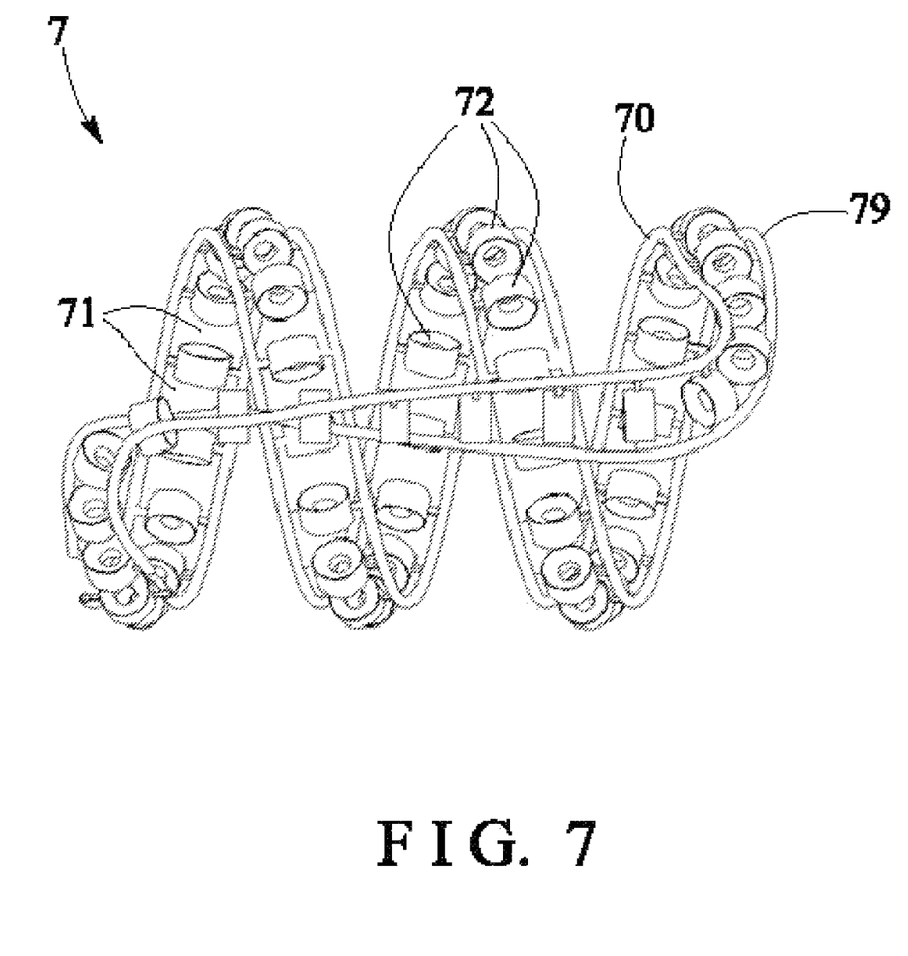
FIG. 7 is a top plan schematic view of the ball coupler.
Figure 8:
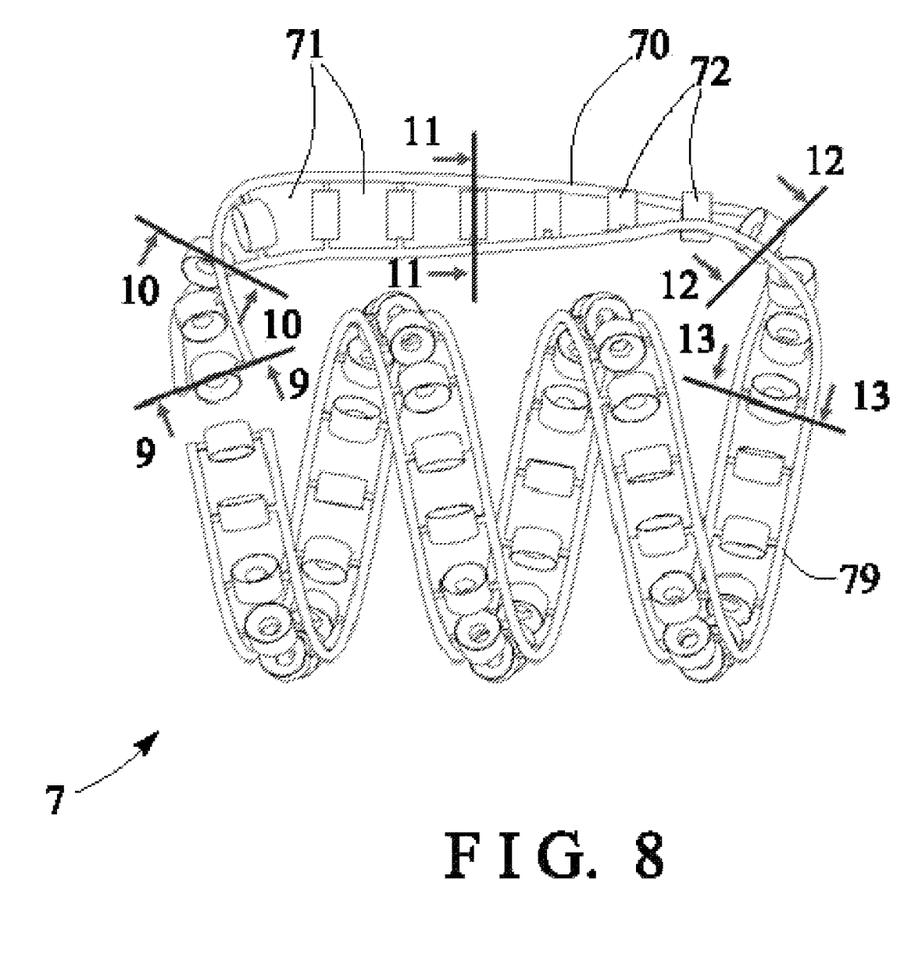
FIG. 8 is a front plan schematic view of the ball coupler.
Figure 9:
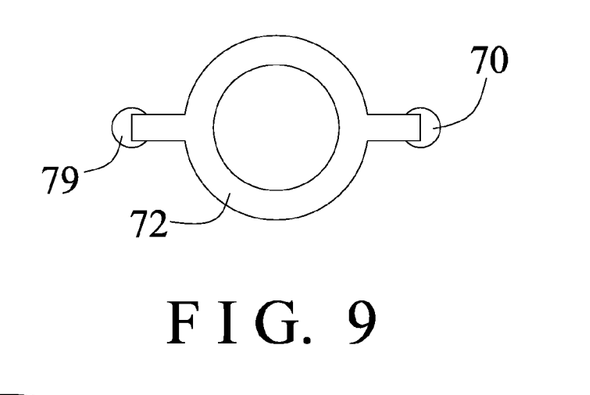
FIGS. 9, 10, 11, 12, 13 are cross sectional views of the ball coupler taken along lines 9-9, 10-10, 11-11, 12-12, 13-13 of FIG. 8 respectively.
Figure 10:
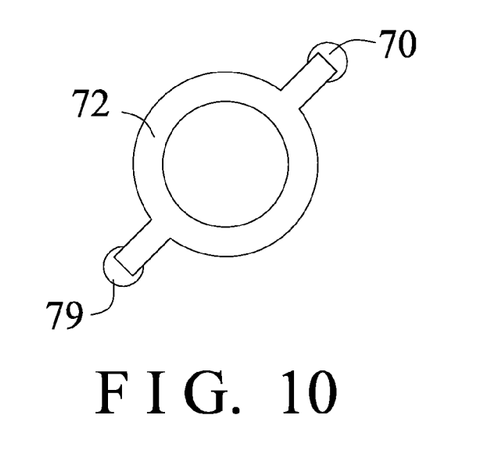
Figure 11:
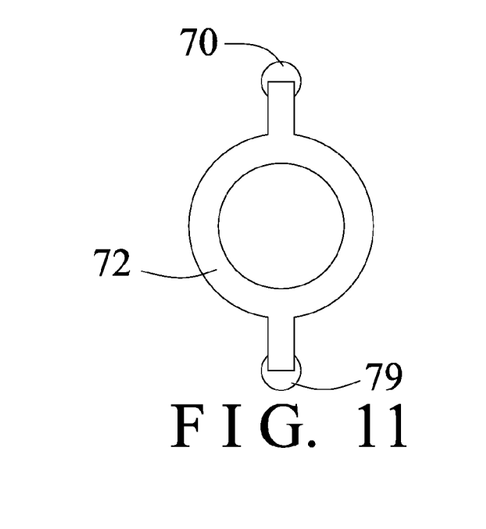
Figure 12:
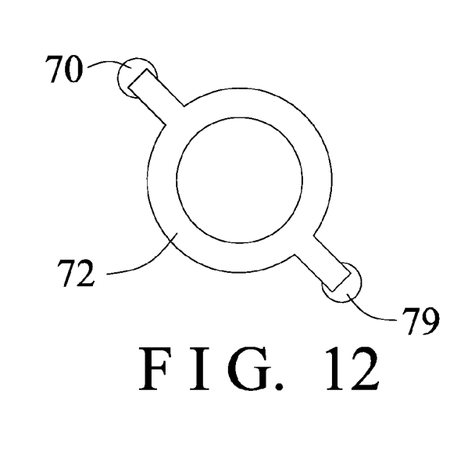
Figure 13:
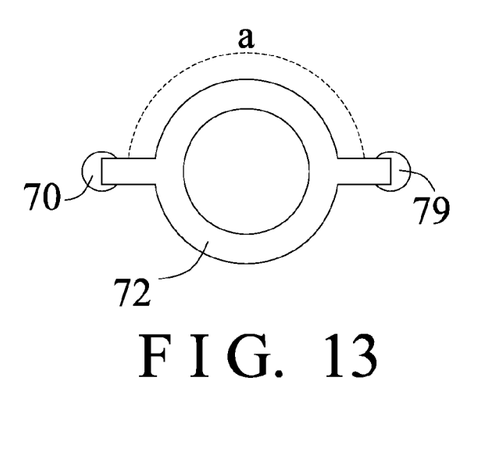

As shown in FIGS. 4-6, the ball circulating member 30 includes two opposite guide pathways 37, 38 formed through the intermediate segment 32 and the curved or end segments 33, 34 of the ball circulating member 30, and communicative with the intermediate portion 35 and the curved portions 36 of the ball circulating channel 31 of the ball circulating member 30, and include two end portions 371, 372; 381, 382 aligned with and communicative with the gap 25 that is formed between the screw shaft 10 and the ball nut 20 (FIG. 2) for suitably and slidably receiving or engaging with the two spaced flexible coupling members 70, 79 of the ball coupler 7, in addition, the two opposite guide pathways 37, 38 of the ball circulating member 30 and the flexible coupling members 70, 79 of the ball coupler 7 (FIGS. 7, 8) are helical and twisted or rotated or curved relative to the ball circulating member 30, between the end segments 33, 34 of the ball circulating member 30, for an angle (a, FIG. 13) ranged between 160-220 degrees, and preferably ranged between 175-185 degrees, such as 180 degrees (FIGS. 9 to 13).

As shown in FIGS. 2-6, for example, the two opposite guide pathways 37, 38 of the ball circulating member 30 include one end portion 371, 381 located at the inner side 39 and the outer side 40 of one end segment 33 respectively, and include the other end portion 372, 382 located at the outer side 41 and the inner side 42 of the other end segment 34 respectively; or one of the two opposite guide pathways 37 of the ball circulating member 30 includes one end portion 371 located at the inner side 39 of one end segment 33 and the other end portion 372 located at the outer side 41 of the other end segment 34, and the other guide pathway 38 of the ball circulating member 30 includes one end portion 381 located at the outer side 40 of one end segment 33 and the other end portion 382 located at the inner side 42 of the other end segment 34.

As shown in FIGS. 5 and 6, the ball circulating devices 3 each may further include two or more partial portions or members 301, 302 each having one half or a portion of the intermediate segment 32 and the curved end segments 33, 34, and each having one half or a portion of the ball circulating channel 31 formed therein for forming the ball circulating channel 31 of the ball circulating member 30 and for suitably circulating and guiding the ball bearing elements 80 to move through the ball circulating channel 31 of the ball circulating member 30 and the endless multiple-turn, helical raceway or ball guiding passage 8 of the ball screw device 1, and the partial members 301, 302 may be mounted or secured together with projections or latches and/or lock notches (not shown).

In operation, as shown in FIGS. 1-4, the two opposite guide pathways 37, 38 of the ball circulating member 30 may suitably receive and circulate and guide the two spaced flexible coupling members 70, 79 of the ball coupler 7 (FIGS. 7, 8) to smoothly move through the ball circulating member 30 and to smoothly move through the gap 25 that is formed between the screw shaft 10 and the ball nut 20. The curvature or the rotation or the twist of the two opposite guide pathways 37, 38 of the ball circulating member 30 relative to the ball circulating member 30 allows the two spaced flexible coupling members 70, 79 of the ball coupler 7 (FIGS. 7, 8) to smoothly move through the ball circulating member 30 without any interference or obstruction and may prevent the flexible coupling members 70, 79 of the ball coupler 7 from being damaged after use.

Accordingly, the motion guide apparatus includes two members movable relative to each other, and a ball circulating device attached to one of the two movable members or a screw shaft and a ball nut for suitably circulating and guiding the ball bearing elements to move through an endless ball guiding passage in the ball screw device or between the two movable members, and the ball circulating device includes a ball circulating channel rotated for an angle ranging from 160 to 220 degrees for suitably guiding and circulating the ball bearing elements and the flexible coupling members of the ball couplers to move through an endless ball guiding passage in the ball screw device or between the two movable members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A motion guide apparatus comprising:
   an elongated shaft including a helical groove formed on an outer peripheral surface thereof,
   a ball nut movably attached onto said elongated shaft, and including a bore formed therein for receiving said elongated shaft, and including a helical groove formed therein, and including two orifices formed therein and communicative with said helical groove of said ball nut, said elongated shaft including an outer diameter smaller than an inner diameter of said bore of said ball nut for forming a gap between said elongated shaft and said ball nut,
   a ball circulating member engaged with said orifices of said ball nut and including a ball circulating channel formed in said ball circulating member and communicative with said helical groove of said ball nut for forming an endless ball guiding passage between said ball nut and said elongated shaft, said ball circulating member including a first end segment and an intermediate segment and a second end segment, said ball circulating channel of said ball circulating member being formed by an intermediate portion and two end portions,
   a plurality of ball bearing elements received and engaged with said endless ball guiding passage, and
   a ball coupler including two flexible coupling members having a plurality of openings formed between spacers for receiving and engaging with said ball bearing elements, and
   wherein said ball circulating member includes two opposite guide pathways formed through said intermediate segment and said end segments of said ball circulating member and communicative with said intermediate portion and said end portions of said ball circulating channel of said ball circulating member for receiving and engaging with said flexible coupling members of said ball coupler, said opposite guide pathways of said ball circulating member and said flexible coupling members of said ball coupler arc helical and rotated and turned relative to said ball circulating member, between said end segments of said ball circulating member, a first guide pathway of said opposite guide pathways of said ball circulating member includes a first end portion located at an inner side of a first end segment of said ball circulating member and a second end portion located at an inner side of a second end segment of said ball circulating member, and a second guide pathway of said opposite guide pathways of said ball circulating member includes a first end portion located at an outer side of said first end segment of said ball circulating member and a second end portion located at an outer side of said second end segment of said ball circulating member, said opposite guide pathways of said ball circulating member each include two end portions aligned with and communicative with said gap that is formed between said elongated shaft and said ball nut, and said flexible coupling members of said ball coupler are received and engaged with said gap that is formed between said elongated shaft and said ball nut, and said opposite guide pathways of said ball circulating member are curved relative to said ball circulating member, between said end segments of said ball circulating member, for an angle ranged between 160-220 degrees.

2. The motion guide apparatus as claimed in claim 1, wherein said opposite guide pathways of said ball circulating member are curved and rotated relative to said ball circulating member, between said end segments of said ball circulating member, for an angle ranged between 175-185 degrees.

3. The motion guide apparatus as claimed in claim 1, wherein said opposite guide pathways of said ball circulating member are curved relative to said ball circulating member, between said end segments of said ball circulating member, for an angle of 180 degrees.

4. The motion guide apparatus as claimed in claim 1, wherein said ball circulating member includes at least two members each having a portion of said intermediate segment and said end segments, and each having a portion of said ball circulating channel formed therein.

\* \* \* \* \*